US010961691B2

(12) United States Patent
Van Der Upwich

(10) Patent No.: US 10,961,691 B2
(45) Date of Patent: Mar. 30, 2021

(54) COUPLING DEVICE FOR COUPLING AND DECOUPLING A FLOW REGULATING DEVICE FROM A WATER PIPING SYSTEM

(71) Applicant: Vitaplus Nederland B.V., Huizen (NL)

(72) Inventor: Stijn Van Der Upwich, Enkhuizen (NL)

(73) Assignee: VITAPLUS NEDERLAND B.V, Huizen (NL)

( * ) Notice: Subject to any disclaimer, the term of this patent is extended or adjusted under 35 U.S.C. 154(b) by 121 days.

(21) Appl. No.: 16/306,987

(22) PCT Filed: Jun. 9, 2017

(86) PCT No.: PCT/NL2017/050384
§ 371 (c)(1),
(2) Date: Dec. 4, 2018

(87) PCT Pub. No.: WO2017/213507
PCT Pub. Date: Dec. 14, 2017

(65) Prior Publication Data
US 2020/0087895 A1  Mar. 19, 2020

(30) Foreign Application Priority Data
Jun. 10, 2016 (NL) ..................................... 2016939

(51) Int. Cl.
*F16L 55/18* (2006.01)
*E03B 7/07* (2006.01)
*F16L 55/07* (2006.01)

(52) U.S. Cl.
CPC ............... *E03B 7/075* (2013.01); *F16L 55/07* (2013.01)

(58) Field of Classification Search
CPC .......... E03B 7/075; E03B 7/095; F16L 55/07; Y10T 137/6011; Y10T 137/7668
See application file for complete search history.

(56) References Cited

U.S. PATENT DOCUMENTS 3,202,175 A * 8/1965 Dumm ................... F16K 27/067
137/454.2
4,387,735 A * 6/1983 Ripert ................... F16K 5/0626
137/315.11

(Continued)

FOREIGN PATENT DOCUMENTS

WO    2015069114 A2    5/2015

OTHER PUBLICATIONS

International Search Report and Written Opinion from PCT/NL2017/050384 dated Aug. 28, 2017 pp. 10.

*Primary Examiner* — Reinaldo Sanchez-Medina
(74) *Attorney, Agent, or Firm* — Kacvinsky Daisak Bluni PLLC

(57) ABSTRACT

A coupling device for coupling and decoupling a flow regulating device from a water piping system. The coupling device includes an inlet and an outlet, each arranged to be connected to a pipe of the piping system, and a holder arranged between the inlet and the outlet for holding the flow regulating device. The coupling device further includes a locking device which is movable from and towards the holder between an unlocked and a locked position. In the locked position, the locking device is arranged to engage and lock the flow regulating device held in the holder and the device is coupled to the inlet and the outlet. In the unlocked position, the locking device is moved away from the flow regulating device for removal of the flow regulating device from the coupling device.

17 Claims, 8 Drawing Sheets

(56) References Cited

U.S. PATENT DOCUMENTS

| | | | | |
|---|---|---|---|---|
| 4,437,486 A | * | 3/1984 | Bianchi | F16K 5/0626 |
| | | | | 137/315.11 |
| 5,035,258 A | * | 7/1991 | Garnham | F16K 3/0272 |
| | | | | 137/454.2 |
| 2002/0104906 A1 | | 8/2002 | Freier | |
| 2008/0236671 A1 | * | 10/2008 | Claude | F16K 15/00 |
| | | | | 137/15.18 |
| 2015/0101681 A1 | * | 4/2015 | Forrest | F16K 13/04 |
| | | | | 137/315.11 |
| 2015/0266036 A1 | * | 9/2015 | Andersen | B05B 13/0627 |
| | | | | 239/563 |

\* cited by examiner

COUPLING DEVICE FOR COUPLING AND DECOUPLING A FLOW REGULATING DEVICE FROM A WATER PIPING SYSTEM

"This is a national stage application filed under 35 U.S.C. § 371 of pending international application PCT/NL2017/050384 filed Jun. 9, 2017, which claims priority to Netherlands Patent application NL 2016939, filed Jun. 10, 2016, the entirety of which applications are hereby incorporated by reference herein."

The present invention relates to a coupling device for coupling and decoupling a flow regulating device from a water piping system. The invention further relates to a method for coupling and decoupling a flow regulating device from a water piping system.

In order to save clean drinking water, it is known to include flow regulating devices, also referred to as flow limiters, in water piping systems to reduce the water usage, for instance when taking a shower or bath. Pressure-independent flow regulating devices are marketed very successfully by applicant. Such flow limiters are described in EP 1.131.687 A and the Netherlands patent application no. 1010592.

These flow regulators/limiters are typically inserted in taps or shower heads or piping associated therewith to keep the flow of water substantially constant regardless of the water pressure. In order to limit and/or keep constant the flow of liquid on a larger scale, for instance in hotels, cruise ships and in (the petrochemical) industry, it is known to provide a device for limiting or regulating a quantity of fluid flowing there through, comprising a housing which comprises a front chamber and a rear chamber; a partition arranged in the housing and provided with two or more openings; and a flow limiter arranged in one or both openings. Such a device is described in WO 2015/069114. By changing the number and/or types of flow limiters in the housing of the device, the flow of water though the device can be accurately adjusted to the specific need.

Such a device is typically included in the water piping system by connecting the housing, which is thereto provided with a suitable inlet and outlet, to the wiper pipes of the piping system, for instance using a coupler, fitting or any other threading connection. It is however a drawback that these devices are not efficiently or easily accessible, for instance for maintenance or replacement. Decoupling of the device from the water piping system for instance needs to be done by specialized personnel and takes time, during which time the water flow though the piping system needs to be interrupted.

It is a goal of the present invention, next to other goals, to at least partially alleviate the above mentioned drawback and/or to provide an efficient, fast to use and/or easy to use coupling device for coupling and decoupling a flow regulating device from a water piping system.

This goal, amongst other goals, is met by a method according to appended claim 1. More specifically, this goal, amongst other goals, is met by a coupling device for coupling and decoupling a flow regulating device from a water piping system, wherein the coupling device comprises an inlet and an outlet, each arranged to be connected to a pipe of the piping system, and a holder arranged between the inlet and the outlet for holding the flow regulating device, wherein the coupling device further comprises a locking device which is movable from and towards the holder between an unlocked and a locked position, wherein in the locked position, the locking device is arranged to engage and lock the flow regulating device held in the holder and wherein the device is coupled to the inlet and the outlet, and wherein in the unlocked position, the locking device is moved away from the flow regulating device for removal of the flow regulating device from the coupling device.

The coupling device is hereby incorporated into the piping system by connecting the inlet and the to respective pipes of the piping system and is arranged to removably receive the flow regulating device in its holder. In use, the position of the flow regulating device is fixed due to the engagement of the locking device. The locking device hereto engages the flow regulating device and preferably prevents relative movement between the flow regulating device and the coupling device. In said locked position, water coming from the inlet is allowed to flow through the flow regulating device held in the holder and through the outlet. At least in the locked position, a flow path is thus created from the inlet, through the holder with flow regulating device towards the outlet.

When the flow regulating device for instance needs maintenance, the locking device is moved from the locked position towards the unlocked position. The locking device moves away from the flow regulating device in the holder such that the locking device no longer exerts a clamping engagement onto the limiting device. The coupling device is then arranged such that in the unlocked position, the flow regulating device can be removed from the coupling device, thereby uncoupling the flow regulating device from the piping system.

The inlet and the outlet may for instance be formed by tubular members. These tubes may be connected to the piping system in a known manner Preferably, the tubular inlet and outlet are provided with threading, preferably external threading, for connecting to the piping system. According to a further preferred embodiment, at least one of the inlet and the outlet, preferably both, are providing with flow blocking means which allow blocking the stream of liquid. This allows easy removal of the flow regulating device without the need to interrupt the flow of water in the whole system. Flow blockers, for instance provided with a faucet, as such are known and can for instance be connected to the coupling device using the inlet or outlet provided with threading.

By proving a locking device which is movable towards and from a device held in the holder, on the one hand a firm interconnection is obtained when the locking device engages the device, while on the other hand by moving the locking device away from the device, the device can be removed efficiently.

For compactness and ease of installation in a piping system, it is preferred if the inlet and the outlet are substantially aligned. The inlet and outlet are preferably in the form of tubular sections which are arranged to connect to the piping system. The tubes of the inlet and the outlet, i.e. the longitudinal or flow axes thereof, are then preferably aligned, such that the coupling device can be easily incorporated in a rectilinear section of a piping system. The inlet and the outlet are thus preferably at least substantially aligned parallel to a flow axis along the flowing direction from the inlet to the outlet. An efficient locking mechanism is then obtained if the locking device is movable along, and more preferably only along, the flow axis. The device held in the holder is hereby locked in the direction of flow, in which direction forces tend to act. Most preferably, the locking position is thereto in the direction of the flow with respect to the unlocked position.

According to a further preferred embodiment, the holder comprises a base arranged to receive a first end of the flow regulating device and wherein the locking device is arranged to engage a second end opposite the first end of the flow regulating device, wherein the locking device is movable from and towards said base. The holder and the locking device hereby engage the flow regulating device on opposite sides, thereby obtaining an efficient locking action. In particular when the locking device is movable along the direction of flow as mentioned above, a highly reliable locking action is obtained in the locking position.

The holder is arranged to receive and hold a flow regulating device, which is preferably also provided with an infeed and an outfeed. Preferably, the coupling device is arranged to receive a substantially cylindrically shaped housing provided with at least one flow limiter/regulator therein. Such a device is described in WO 2015/069114, which is hereby incorporated by reference. The infeed and outfeed are preferably arranged at the top and lower surfaces of the cylinder.

At least in the locked position, the infeed or inlet of the flow regulating device needs to be coupled to the inlet of the coupling device and the outfeed or outlet of the flow regulating device needs to be coupled to the outlet of the coupling device to allow a flow from the inlet, though the flow regulating device towards the outlet.

It is then preferred if at least one of the locking device and the base of the holder as mentioned above is arranged to cooperate with the infeed or outfeed of the flow regulating device. The locking device or base thereto preferably comprises a conduit for coupling with said infeed or outfeed. Said conduit is then preferably coupled to, or debouches in, the inlet or outlet of the coupling device.

It is hereby preferred if both the locking device and the base are arranged to cooperate with the infeed and outfeed of the flow regulating device held in the holder. In particular when the base and the locking device are arranged to receive the flow regulating device there between, a compact and efficient coupling device is obtained. It is then further preferred if the locking device is movable along this flow axis as mentioned above, which allows a clamping connection between the flow regulating device and the coupling device, in particular the locking device and the base thereof, on the end surfaces of the flow regulating device provided with the infeed and outfeed, respectively.

The conduit of the locking device may for instance be defined by a tubular member, wherein said tubular member debouches in, or is coupled to, the inlet or the outlet in at least the locked position. More generally, it is thus preferred if the locking device comprises a tubular member which debouches in at least one of the inlet and the outlet of the coupling device in at least the locked position. In the locked position, the tubular member cooperates with one of the infeed or outfeed of the flow regulating device in preferably a clamping action, thereby achieving a firm and reliable connection between the tubular locking device and the flow regulating device. The opposite end of the tubular locking device then debouches in, or is coupled to, the inlet or the outlet of the coupling device, thereby forming a conduit between the inlet and infeed, or outlet or outfeed, respectively.

According to a further preferred embodiment, the inlet or outlet, preferably the inlet, comprises a feed tube, wherein the tubular member of the locking device is arranged coaxially with respect to the said feed tube such that the tubular member is movable along the feed tube for moving between the locked and unlocked position. The tubular locking device is then received in or around the tubular inlet or outlet and is allowed to move with respect to said tubular inlet or outlet, i.e. the feed tube. The feed tube is preferably dimensioned not to contact the flow regulating device and thus extends on a distance from the flow regulating device, wherein the tubular locking device is arranged bridge the distance between the feed tube and the flow regulating device in the locked position. At least in the locked position, the tubular member of the locking device thus protrudes from the feed tube to couple the feed tube to the flow regulating device, in particular the infeed or outfeed thereof.

In general, movement of the locking device with respect to the coupling device, in particular the holder thereof as explained above, may be achieved with suitable moving means arranged to move the locking means, preferably manually. A lockable handle for moving the locking device may for instance be provided. Other linear moving means are also envisaged.

Efficient movement is achieved when the tubular member of the locking device is provided with threading for moving the locking device. Rotation then allows movement of the locking device, while the threading provides good resistance against unintentional movement along the threading direction, which is preferably parallel to the direction of movement of the locking device.

It is for instance possible that the tubular member of the locking device and the feed tube engage by cooperating threading. Rotation of the tubular member with respect to the feed tube then results in movement of the tubular member of the locking device. Also here, a suitable handle can be provided to allow rotation.

In order be able to efficiently move the tubular member of the locking device, it is preferred if the tubular member is arranged coaxially around the feed tube. The coupling device is then preferably provided with suitable moving means for moving the tubular member of the locking device with respect to the feed tube.

Efficient movement is possible when the tubular member of the locking device is provided with external threading or a rack and wherein the coupling device further comprises a rotating member arranged to engage the threading of the tubular member for moving said tubular member. By engaging this threading with a rotating member, such as a gear, pinion or sprocket, the tubular member can be moved efficiently. Movement of the rotating member is preferably limited to rotation of said member only. The rotating member is preferably supported by a frame of the coupling device. Such a frame may for instance interconnect the inlet and the outlet and may be provided with connecting beams extending at mutual distances allowing passage of the flow regulating device in the unlocked position.

According to a further preferred embodiment, the rotating member is arranged coaxially around the tubular member of the locking device, wherein the rotating member is provided with internal threading cooperating the external threading of the tubular member, wherein the rotating member is rotatably mounted in a frame of the coupling device. Rotation of the rotating member will then result in movement of the tubular member of the locking device. The rotating member may for instance be received in correspondingly shaped grooves in the frame, such that other displacement than rotation of the rotation member is prevented a mentioned above.

For locking the rotating member, the frame and the rotating member are preferably provided with coinciding holes for receipt of a pin. Preferably, the rotating member is provided with a plurality of said holes around the circumference thereof.

In order to reduce any negative effects of a varying pressure in the flow line, for instance due to an upstream pressure regulator, it is preferred if the coupling device is provided with dampening means in the flow path. The dampening means, or damper, may for instance comprises a tubular part of resilient material included in the one of the tubes. Preferably the dampening means are provided in inlet or the feed tube, which is preferably arranged upstream of the flow regulating device.

It is noted that with the term flow regulating device as used herein, devices are meant which in some way regulate the flow, for instance in terms of flow rate or pressure. Preferably, the flow regulating device comprises a flow limiting device. The invention is further not specifically limited to a device for coupling and uncoupling flow regulating devices from a piping system. The device of the invention can be used to couple and decouple other devices for use in piping systems, such as sieves, sensors and the like. It is also possible that the coupling devices is used for coupling and decoupling devices from other piping systems than water piping systems. The device can be applied to any piping or tubular system carrying a liquid or even a fluid.

The invention further relater to a coupling device according invention provided with a flow regulating device and to a building provided with a water piping system provided with a coupling device according to the invention.

The invention furthermore relates to a method for decoupling a flow regulating device from a water piping system provided with a coupling device according to the invention, comprising the steps of moving the locking device to the unlocked position and removing the flow regulating device from the coupling device.

The present invention is further illustrated by the following Figures, which show a preferred embodiment of the device according to the invention, and are not intended to limit the scope of the invention in any way, wherein.

Figure 1A:
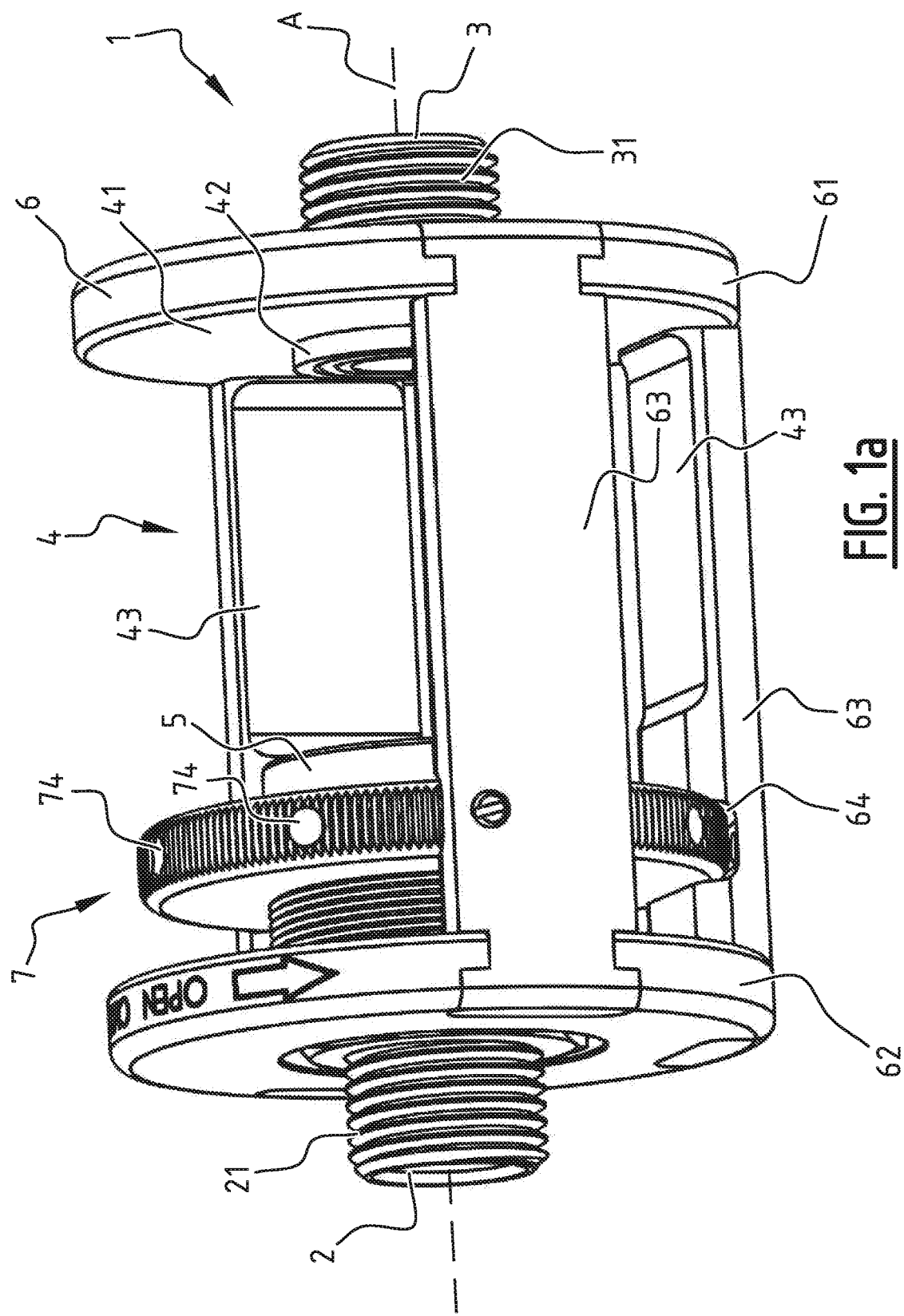
FIGS. 1a and 1b show an empty coupling device and a coupling device with a flow regulator, respectively.
Figure 1B:
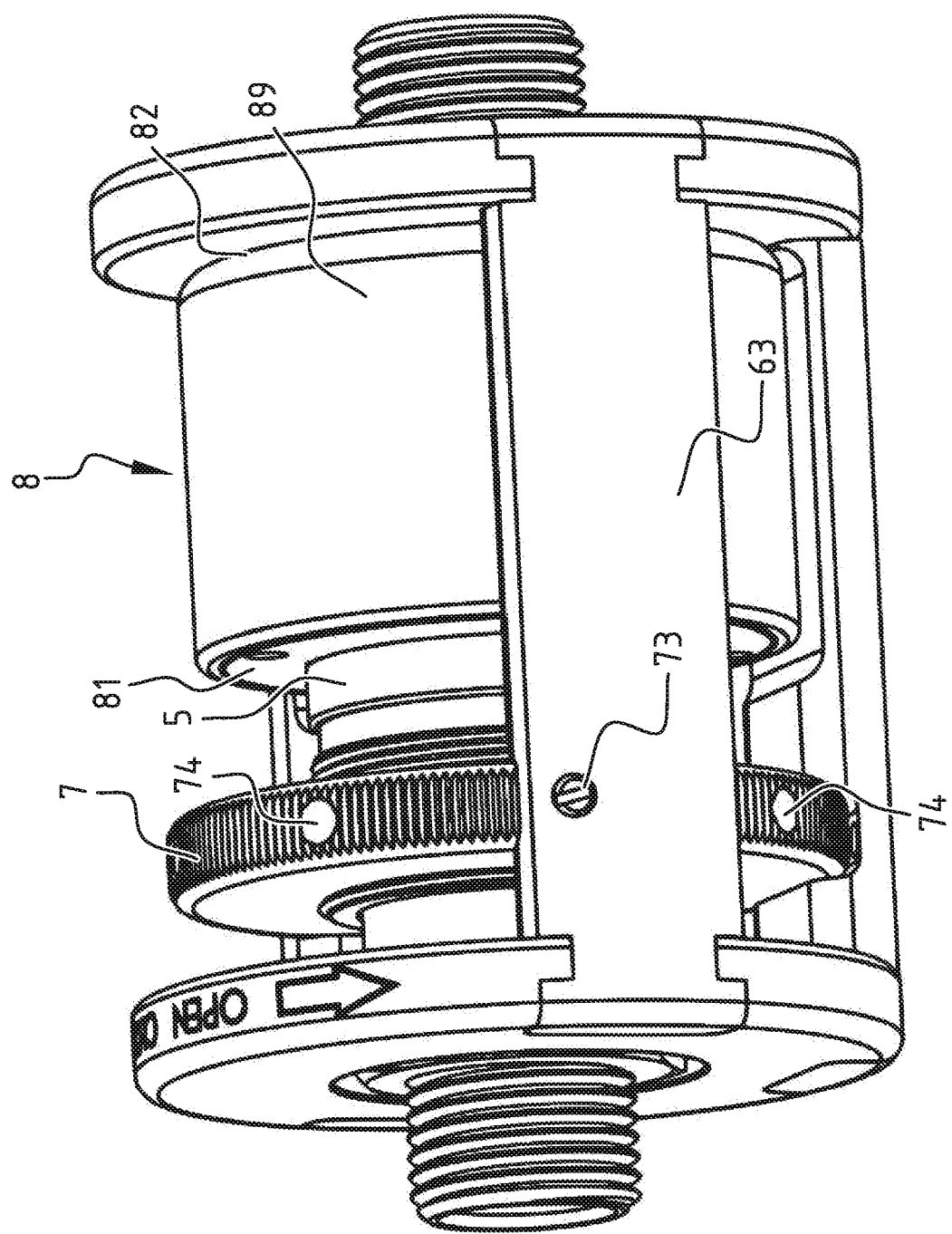

In FIG. 1a, a coupling device 1 is shown which is arranged to be coupled into a water piping system using threading 21 provided on an inlet tube 2 and threading 31 provided on an outlet tube 3. The coupling device 1 is provided with a holder 4 which is arranged to receive a flow regulator 8, see also FIGS. 1b and 2.

Such a flow regulator 8 has a cylindrical shape with a first surface 81 provided with an infeed 84 and a second surface 82 provided with an outfeed 83. Infeed 84 is provided with a sieve 85 in this example. In the housing 89 of the regulator 8, a partition 88 is provided between the infeed 84 and the outfeed 83, which partition 88 is provided with openings 86. In one opening 86, a flow regulating element 9 is received. The flow regulating and limiting element 9 limits the flow between the indeed 84 and outfeed 83 of the flow regulator 8.

Returning to the coupling device 1, the coupling device 1 comprises two end plates 61 and 62, in between which beams 63 extend which interconnect the inlet 2 and the outlet 3 in a structural way. As can be best seen in FIG. 1a and FIG. 2, the beams are provided with recesses 43 for receiving the housing 89 of the flow regulator 8.

The end plate 61 forms a base 41 of the holder 4 and is provided with a protruding ring 42 forming a conduit to the outlet tube 3. The end surface 82 with the outfeed 83 is provided with a recessed groove 82a which is arranged to closely receive the ring 42. For ensuring a liquid tight connection, a gasket or O-ring 42a is provided there between.

The inlet tube 2 extends beyond the end plate, as seen along the flow axis A coinciding with the longitudinal axes of both the inlet tube 2 and outlet tube 3, and forms feed tube 22. The feed tube 22 is provided with a recessed groove 23 wherein a damper 24 of flexible material is received.

Figure 2:
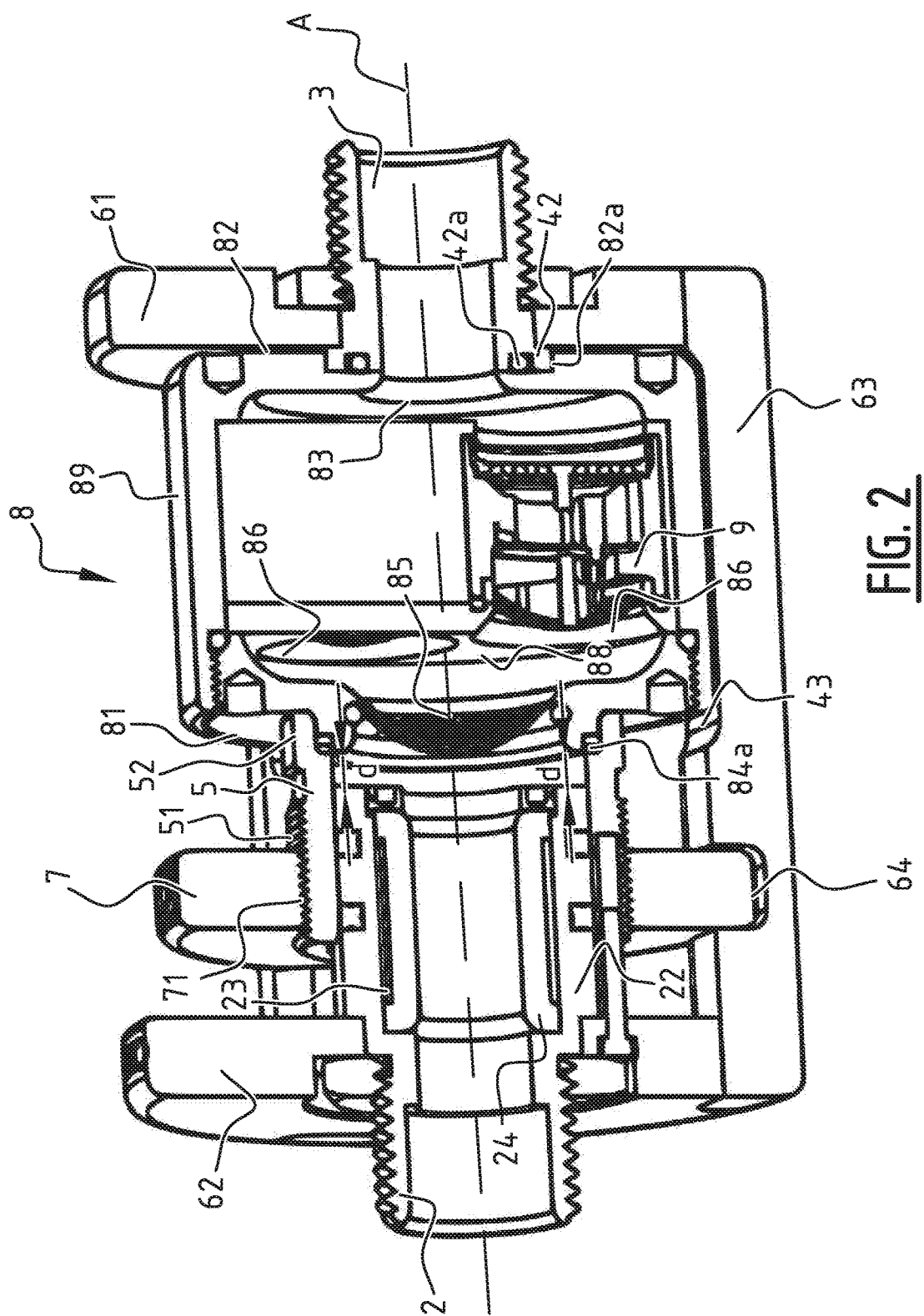
FIG. 2 shows a the coupling device of FIG. 1b is cross-section.

In FIG. 2 it is visible that the outer end of feed tube 22 extends at a distance d from the infeed 84 of the flow regulator 8. This distance d is bridged by the locking tube 5 which is arranged coaxially around the feed tube 22. The outer end 52 of the locking tube 5 engages the surface 81 of the flow regulator 8 and cooperates with the infeed 84 thereof for obtaining a liquid tight connection between the locking tube 5 and the infeed 84. A gasket or O-ring 84a is thereto further provided.

In the locked position of the locking tube 5, the flow regulator 8 is tightly enclosed by the outer end 52 of the locking tube 5 and the base 41. Any movement of the flow regulator 8 in the direction along the flow direction A is thus prevented. The ring 42 received in the correspondingly shaped groove 82a and the outer end 52 engaging around the protruding ring of the infeed 84 limits movement in a direction perpendicular to the flow direction A. Also the beams 63 help limiting this movement.

When the flow regulator 8 needs to be removed, for instance for maintenance or for changing the flow limiting characteristics by changing the amount and/or types of limiting elements 9 in the housing 89, the locking tube 5 needs to be moved to the unlocked position. For unlocking the flow regulator 8, the locking tube 5 is thus movable away from the holder 4, specifically the base 41 thereof. For locking a regulator 8 again, the tube 5 is also movable towards said base 41 to again engage the end surface 81 of the regulator 8.

To allow movement of the locking tube 5 with respect to the holder 4, and thereby a regulator 8 held therein, the tube 5 is arranged coaxially around the feed tube 22 such that the locking tube 5 is allowed to slide thereon. The inter diameter of the locking tube 5 thereto corresponds to the outer diameter of the feed tube 22.

A part of the outer circumferential surface of the locking tube 5 is provided with threading 51 which is arranged to cooperate with internal threading 71 of rotating disc 7. Rotating disc 7 is allowed to rotate with respect to the coupling device 1 and is received and held in grooves 64 in beams 63. Movement of the disc 7 in the direction of flow A is thus prevented. In use, when removal of the regulator 8 from the coupling device 1 is not wanted, rotation of the disc 7 can be prevented by inserting a pin 74 though a hole provided in the beam 63 and a hole 74 in the circumferential surface of the disc 7.

Figure 3A:
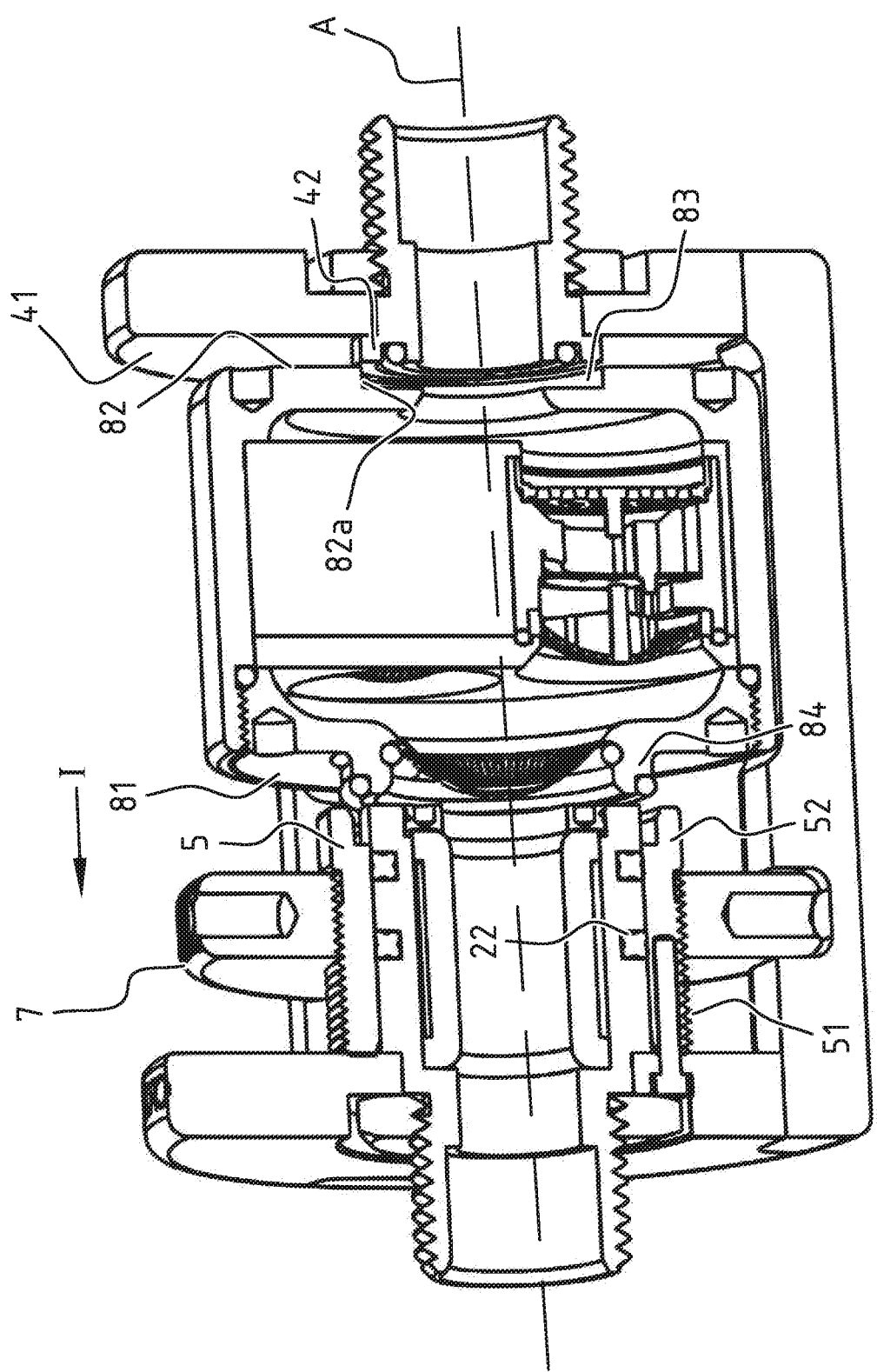
FIGS. 3a and 3b show the coupling device in unlocked position in cross-section and in side-view, respectively.
Figure 3B:
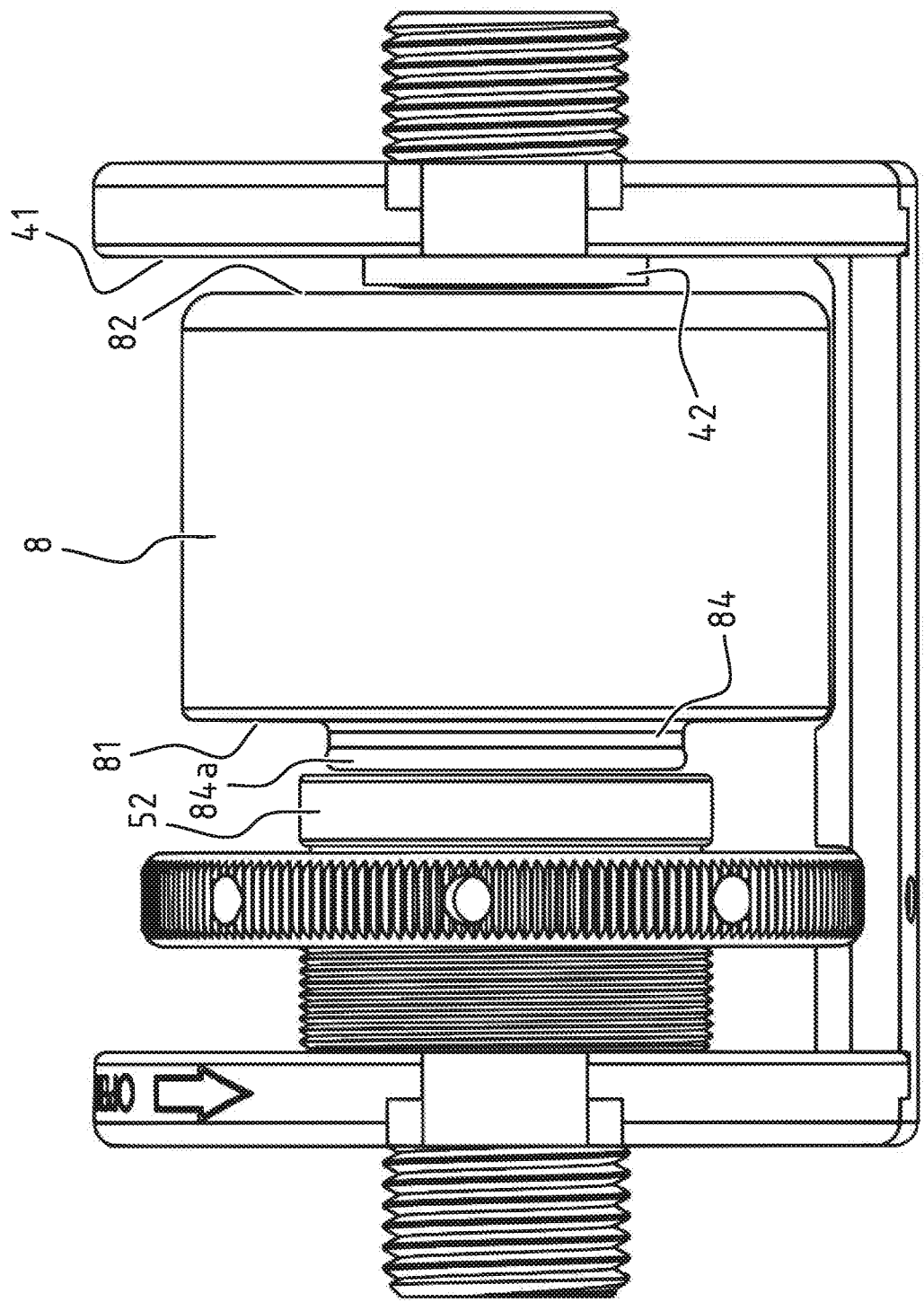
Figure 4:
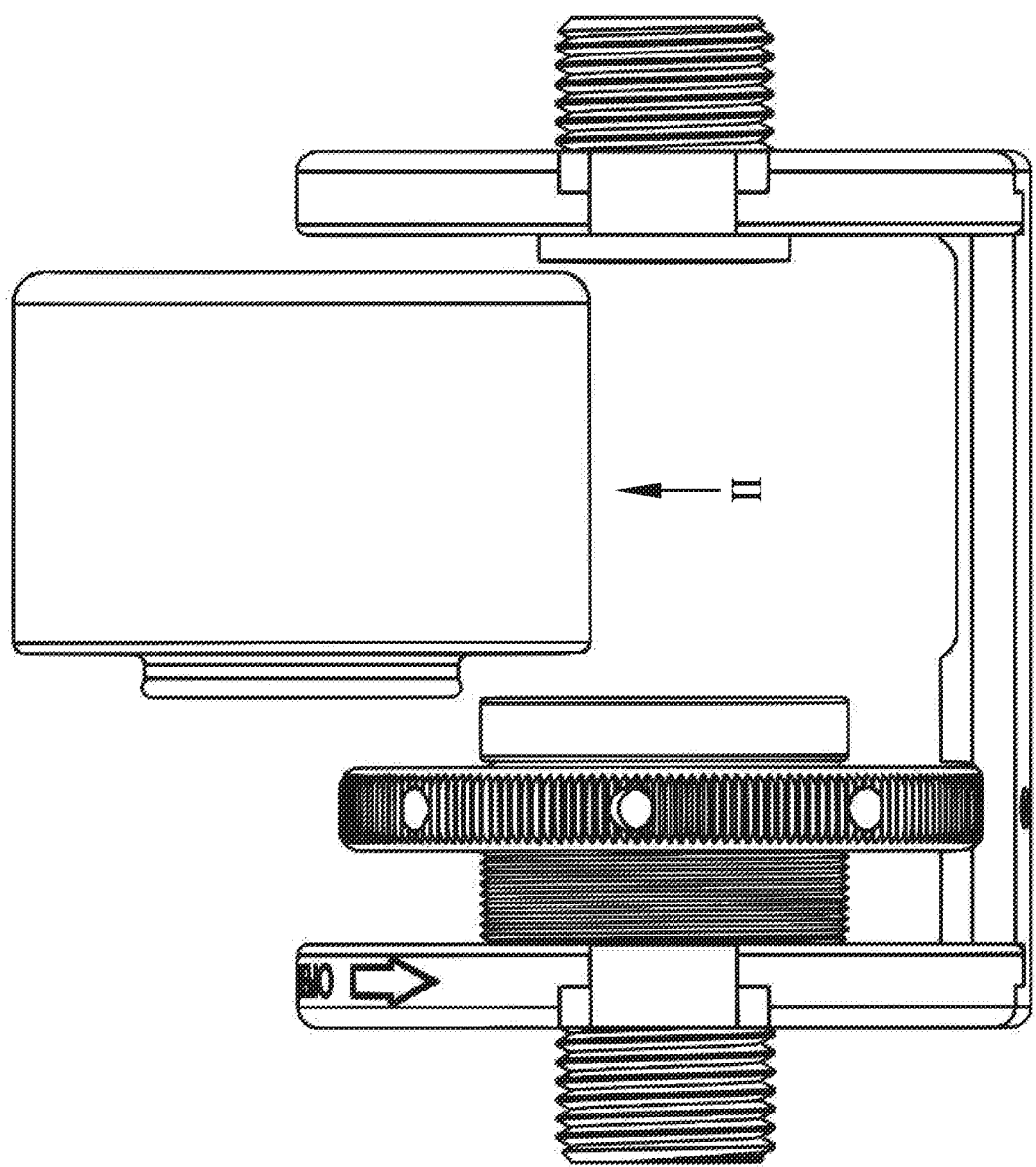
FIG. 4 shows the removal of the flow regulator from the coupling device.

Upon rotation of the disc 7 along the rotation axis which coincides in this example with the flow axis A, the threading 71, 51 cooperate, thereby moving the locking tube 5 along the flow axis A. In FIGS. 3a and 3b, the locking tube 5 has moved due to rotation of the disc 7 such that the outer end 52 of the locking tube 5 coincides with the outer end of the feed tube 22. The distance between the outer end 52 and the base 41 has increased such that the regulator 8 is now movable along the flow axis A. See in this respect also the distance between the end surface 82 of the regulator and the base 41. The ring 42 is now free from the groove 82a such that the regulator 8 can be moved in a radial direction away from the coupling device, indicated with the arrow II in FIG. 4.

Inserting and locking a regulator 8 in the coupling device 1 can be done by repeating the steps in reversed order.

Figure 5A:
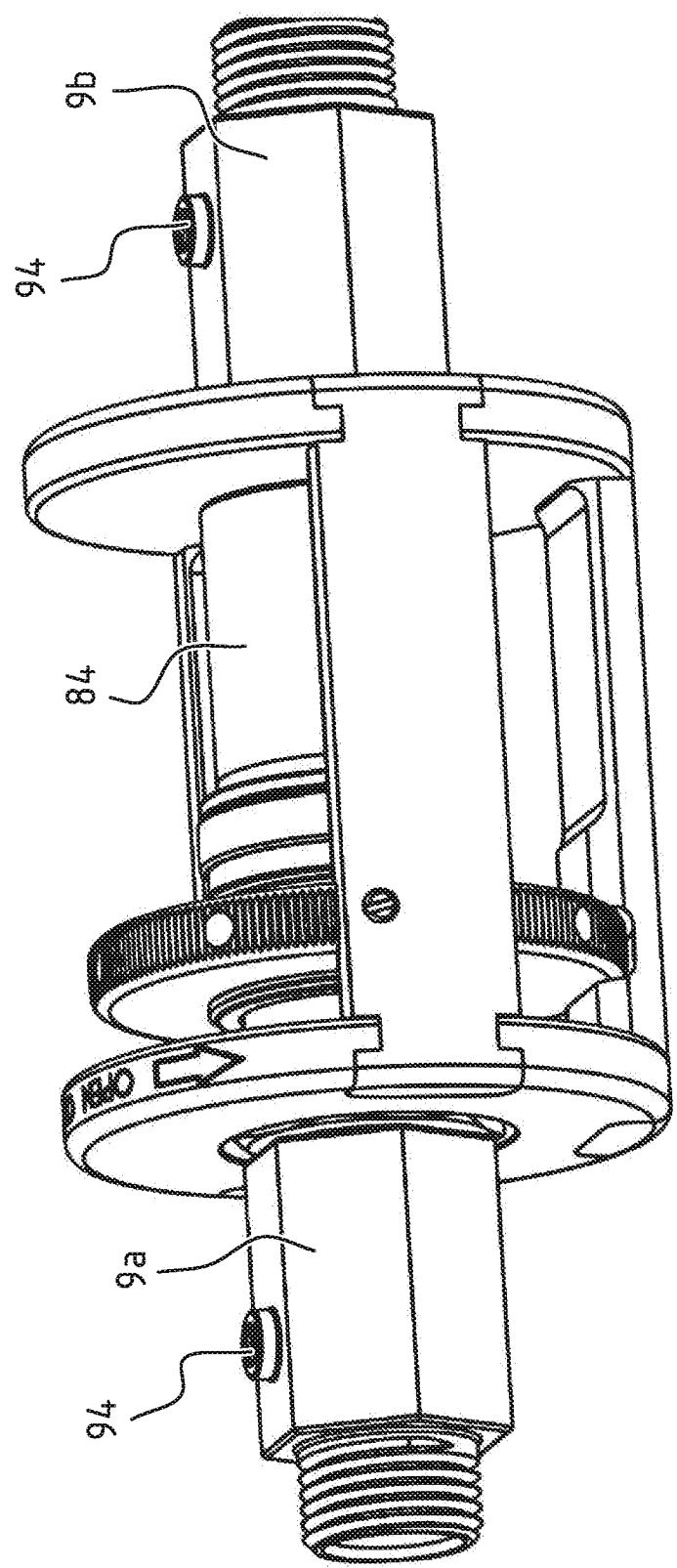
FIGS. 5a and 5b show an alternative flow regulator in the coupling device provided with flow blockers in perspective and cross-sectional view respectively.
Figure 5B:
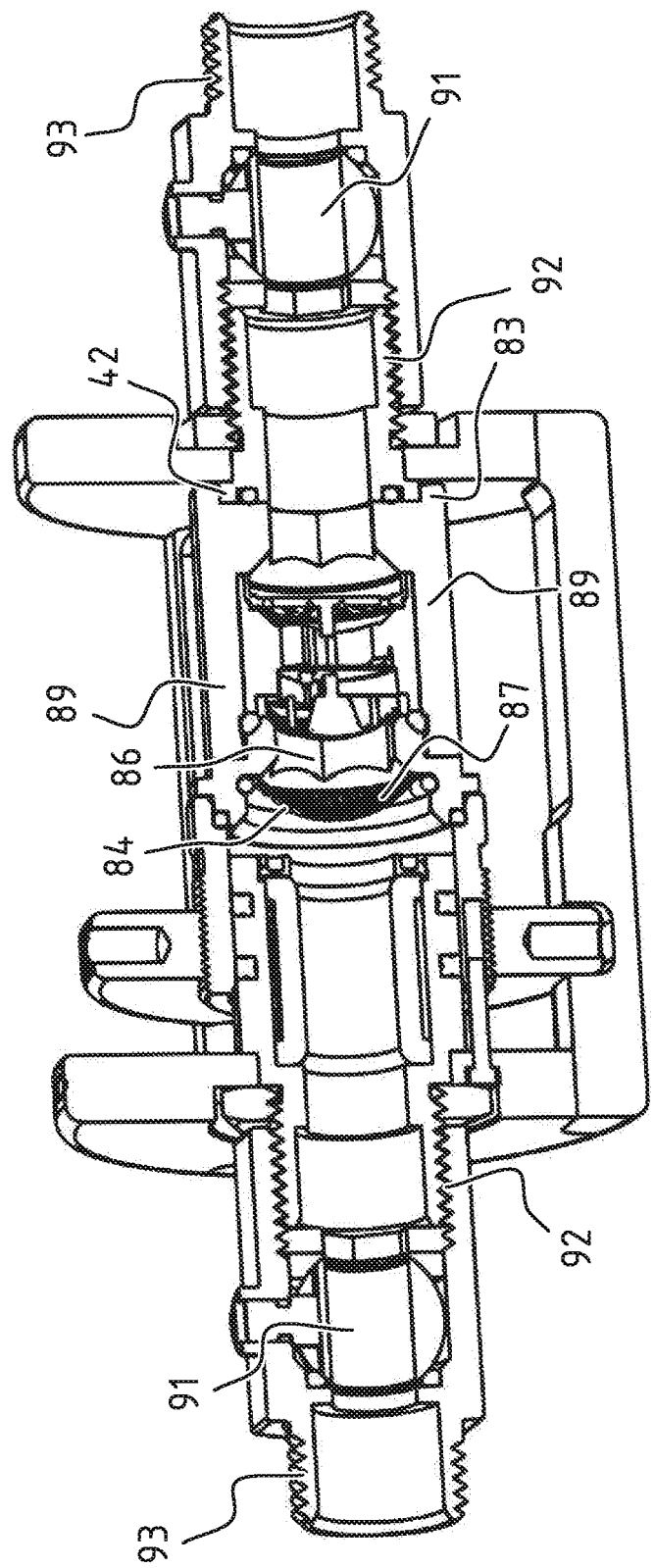

From FIGS. 5a and 5b it follows that also a differently sized regulator 8a can be efficiently received. In this example, only a single limiting element 9 is held in an opening 86 in the housing 89 of the regulator 8. The outfeed 83 and the infeed 84 are shaped in accordance with the regulator of the first example. For larger regulators, the coupling device 1 can be customized, for instance by enlarging the end plates 61 and 62 in terms of diameter and and/or increasing the distance between said end plates 61 and 62.

Also shown in FIGS. 5a and 5b are closing elements 9a and 9b provided on the inlet 2 and the outlet 3, respectively. The closing elements 9a and 9b are provided with a faucet 91 which can be operated by turning knobs 94 to close the liquid flow through the closing elements 9a and 9b. The closing elements 9a and 9b are connected to inlet 2 and outlet 3 using corresponding threading 92. The other ends are also provided with threading 93 for connection to piping of the water system.

The present invention is not limited to the embodiment shown, but extends also to other embodiments falling within the scope of the appended claims.

The invention claimed is:

1. Coupling device arranged and configured to couple and decouple a flow regulating device from a water piping system, wherein the coupling device comprises an inlet and an outlet, each of said inlet and said outlet arranged to be connected to a pipe of the piping system, and a holder arranged between the inlet and the outlet, the holder arranged and configured to hold the flow regulating device,
   wherein the coupling device further comprises a locking device which is movable with respect to the coupling device, from and towards the holder by a moving mechanism comprising threading, between an unlocked and a locked position,
   wherein in the locked position, the locking device is arranged to engage and lock the flow regulating device held in the holder and wherein the device is coupled to the inlet and the outlet, and
   wherein in the unlocked position, the locking device is moved away from the flow regulating device for removal of the flow regulating device from the coupling device.

2. The coupling device according to claim 1, wherein the holder comprises a base arranged to receive a first end of the flow regulating device and wherein the locking device is arranged to engage a second end opposite the first end of the flow regulating device, and wherein the locking device is movable away from and towards said base.

3. The coupling device according to claim 2, wherein the locking device and the base are arranged to cooperate with an infeed and an outfeed of the flow regulating device held in the holder.

4. The coupling device according to claim 3, wherein the locking device and the base comprise a conduit debouching in the inlet or the outlet of the coupling device.

5. The coupling device according to claim 3, wherein the locking device comprises a tubular member which debouches in at least one of the inlet and the outlet of the coupling device in at least the locked position.

6. The coupling device according to claim 5, wherein the inlet or outlet comprises a feed tube, and wherein the tubular member of the locking device is arranged coaxially with respect to the said feed tube such that the tubular member is movable along the feed tube for moving between the locked and unlocked position.

7. The coupling device according to claim 6, wherein the tubular member of the locking device is arranged coaxially around the feed tube, and wherein the moving mechanism comprises threading on the tubular member of the locking device for moving the locking device.

8. The coupling device according to claim 7, wherein the tubular member of the locking device is provided with external threading and wherein the coupling device further comprises a rotating member arranged to engage the threading of the tubular member for moving said tubular member.

9. The coupling device according to claim 8, wherein the rotating member is arranged coaxially around the tubular member of the locking device, wherein the rotating member is provided with internal threading cooperating the external threading of the tubular member, and wherein the rotating member is rotatably mounted in a frame of the coupling device.

10. The coupling device according to claim 9, wherein the frame and the rotating member are provided with coinciding holes for receipt of a pin.

11. The coupling device according to claim 1, further provided with dampening means in a flow path.

12. The coupling device according to claim 11, wherein the inlet or outlet comprises a feed tube, the dampening means are provided in the feed tube.

13. The coupling device according to claim 1, wherein the inlet and the outlet are at least aligned parallel to a flow axis along the flowing direction from the inlet to the outlet, and wherein the locking device is movable along the flow axis.

14. The coupling device according to claim 1, further comprising the flow regulating device.

15. The coupling device according to claim 1, wherein the coupling device comprises two end plates, in between which beams extend which interconnect the inlet and the outlet in a structural way.

16. A building provided with a water piping system including a coupling device according to claim 1.

17. A method for decoupling a flow regulating device from a water piping system provided with a coupling device according to claim 1, the method comprising:
   moving the locking device to the unlocked position, and
   removing the flow regulating device from the coupling device.

* * * * *